United States Patent
Wang (10) Patent No.: US 12,259,765 B2
(45) Date of Patent: Mar. 25, 2025

(54) POWER CONTROL CIRCUIT AND CONTROL METHOD THEREOF

(71) Applicant: Ace Power and Technology Co., Ltd, Shanghai (CN)

(72) Inventor: Yuetian Wang, Shanghai (CN)

(73) Assignee: Ace Power and Technology Co., Ltd, Shanghai (CN)

( * ) Notice: Subject to any disclaimer, the term of this patent is extended or adjusted under 35 U.S.C. 154(b) by 15 days.

(21) Appl. No.: 17/933,764

(22) Filed: Sep. 20, 2022

(65) Prior Publication Data

US 2023/0205288 A1 Jun. 29, 2023

(30) Foreign Application Priority Data

Dec. 29, 2021 (CN) .......................... 202111682370.4

(51) Int. Cl.
*G06F 1/26* (2006.01)
*G06F 1/3203* (2019.01)
(Continued)

(52) U.S. Cl.
CPC ................ *G06F 1/26* (2013.01); *H02J 3/007* (2020.01); *G06F 1/263* (2013.01); *G06F 1/266* (2013.01);
(Continued)

(58) Field of Classification Search
CPC .......... G06F 1/3203; G06F 1/26; G06F 1/266; G06F 1/263; G06F 13/4282; H02J 3/007
(Continued)

(56) References Cited

U.S. PATENT DOCUMENTS

| 5,631,814 A | 5/1997 | Zak |
| 10,298,023 B2 | 5/2019 | Liao et al. |

(Continued)

FOREIGN PATENT DOCUMENTS

| CN | 103178703 A | 6/2013 |
| CN | 103227566 A | 7/2013 |

(Continued)

OTHER PUBLICATIONS

Extended European Search Report issued in counterpart European Application No. 22195980.2 on May 26, 2023.
(Continued)

*Primary Examiner* — Ji H Bae
(74) *Attorney, Agent, or Firm* — Hamilton, Brook, Smith & Reynolds, P.C.

(57) ABSTRACT

A power control circuit and a control method thereof. The circuit includes: a power supply module, a voltage change signal module, an output module, a first switch module and a second switch module; the power supply module is configured to output power supplies of different power through two output terminals according to an output of an external power supply end and a received first control signal; the output module is configured to provide the power supplies to an information processing system connected to the output module, and transmit a trigger signal provided by the information processing system to the voltage change signal module; the first switch module and the second switch module are configured to disconnect and conduct a power supply channel between the output module and the power supply module according to a received second control signal and third control signal; the voltage change signal module is configured to output the first control signal to the power supply module according to the trigger signal, and output the (Continued)

second control signal and the third control signal to the first switch module and the second switch module, respectively.

8 Claims, 5 Drawing Sheets

(51) Int. Cl.
   *G06F 13/42* (2006.01)
   *H02J 3/00* (2006.01)
(52) U.S. Cl.
   CPC ........ *G06F 1/3203* (2013.01); *G06F 13/4282* (2013.01)
(58) Field of Classification Search
   USPC .......................................... 713/300; 710/313
   See application file for complete search history.

(56) References Cited

U.S. PATENT DOCUMENTS

| | | | |
|---|---|---|---|
| 11,005,378 B2 | 5/2021 | Medina-Garcia | |
| 11,018,592 B2 | 5/2021 | Ausseresse et al. | |
| 2008/0174276 A1 | 7/2008 | Takahashi et al. | |
| 2009/0236916 A1 | 9/2009 | Nishimura | |
| 2011/0090717 A1 | 4/2011 | Lee et al. | |
| 2013/0099720 A1 | 4/2013 | Chuah et al. | |
| 2013/0162048 A1 | 6/2013 | Kim et al. | |
| 2013/0332642 A1* | 12/2013 | Capezza | G06F 13/4081 710/304 |
| 2014/0312862 A1 | 10/2014 | Xie et al. | |
| 2015/0162782 A1 | 6/2015 | Kanakasabai et al. | |
| 2015/0180350 A1 | 6/2015 | Huang et al. | |
| 2016/0034333 A1* | 2/2016 | Ozawa | G06F 11/0757 713/300 |
| 2016/0225559 A1* | 8/2016 | Ueki | G06F 1/266 |
| 2016/0329811 A1 | 11/2016 | Du et al. | |
| 2017/0237332 A1 | 8/2017 | Takahashi et al. | |
| 2018/0067885 A1* | 3/2018 | Hsieh | G06F 1/22 |
| 2018/0294734 A1 | 10/2018 | Song et al. | |
| 2018/0302005 A1 | 10/2018 | Cui et al. | |
| 2018/0337606 A1 | 11/2018 | Ausseresse et al. | |
| 2018/0367042 A1 | 12/2018 | Andersen et al. | |
| 2019/0033953 A1* | 1/2019 | Kadgi | G06F 13/4282 |
| 2019/0036442 A1 | 1/2019 | Oh | |
| 2019/0044372 A1 | 2/2019 | Cochran | |
| 2020/0021200 A1 | 1/2020 | Medina-Garcia | |
| 2020/0142463 A1 | 5/2020 | Hand et al. | |
| 2021/0193366 A1 | 6/2021 | Wang et al. | |
| 2021/0203168 A1* | 7/2021 | Sharma | G06F 1/266 |
| 2021/0344211 A1 | 11/2021 | Yu et al. | |
| 2022/0107675 A1* | 4/2022 | Kim | H03K 3/037 |
| 2022/0404891 A1* | 12/2022 | Wang | G06F 1/26 |
| 2023/0068669 A1 | 3/2023 | Hanaoka et al. | |
| 2023/0208273 A1 | 6/2023 | Wang | |
| 2024/0305103 A1 | 9/2024 | Wang | |
| 2024/0339941 A1* | 10/2024 | Wang | H02M 1/14 |
| 2024/0348170 A1* | 10/2024 | Wang | H02M 1/088 |

FOREIGN PATENT DOCUMENTS

| | | |
|---|---|---|
| CN | 106329890 A | 1/2017 |
| CN | 108933515 A | 12/2018 |
| CN | 110138223 A | 8/2019 |
| CN | 110289766 A | 9/2019 |
| CN | 110719046 A | 1/2020 |
| CN | 111404393 A | 7/2020 |
| CN | 111446858 A | 7/2020 |
| CN | 111541257 A | 8/2020 |
| CN | 111600499 A | 8/2020 |
| CN | 211957378 U | 11/2020 |
| CN | 112067886 A | 12/2020 |
| CN | 112072924 A | 12/2020 |
| CN | 112803800 A | 5/2021 |
| CN | 113346756 A | 9/2021 |
| CN | 113364295 A | 9/2021 |
| CN | 113428028 A | 9/2021 |
| CN | 113760072 A | 12/2021 |
| CN | 114157159 A | 3/2022 |
| CN | 216414195 U | 4/2022 |
| CN | 216599026 U | 5/2022 |
| EP | 3726722 A1 | 10/2020 |
| TW | 201838303 A | 10/2018 |
| WO | 2014/132452 A1 | 9/2014 |
| WO | 2015/027693 A1 | 3/2015 |
| WO | 2021/128778 A1 | 7/2021 |
| WO | 2023/098016 A1 | 6/2023 |
| WO | 2023/098146 A1 | 6/2023 |
| WO | 2023/098193 A1 | 6/2023 |

OTHER PUBLICATIONS

"Inverter Power Technology in New Energy Power Generation," Non-dispatchable grid-connected PV system, 83 pages (With English Abstract), no date given.

Hongtao et al., "Input-parallel-output-parallel Wide-range Bidirectional Isolated DC/DC Converter," Journal of Power Supply, vol. 18, No. 3, pp. 13-20 (2020).

Medina-Garcia, A. et al., "Resonant Hybrid Flyback, a New Topology for High Density Power Adaptors," Electronics, 7 (12), 363, 12 pages (2018).

* cited by examiner

POWER CONTROL CIRCUIT AND CONTROL METHOD THEREOF

RELATED APPLICATION

This application claims priority under 35 U.S.C. § 119 or 365 to Chinese Application Number 202111682370.4, filed on Dec. 29, 2021, the subject matter of which is incorporated herein by reference in its entirety.

FIELD

The present disclosure relates to the technical field of information processing, and particularly to a power control circuit and a control method thereof.

BACKGROUND

The USB Power Delivery (USB PD) is widely used in the market due to its variable output voltage of 5 to 20V. The conventional USB PD adaptors in the market are mostly of 65 W, and the topology architecture is a flyback converter. However, with the improvement of the performance of the notebook computers in recent years, the requirements of the USB PD power level are increasingly higher, and the flyback converter is not suitable for the high-power applications because of its characteristic of inductive energy storage. Thus, a solution is provided in the industry to ensure a full-load efficiency by taking a resonant circuit LLC as a main output, while adding a stage of circuit Buck to provide a low-voltage output. An output of the LLC is connected to an output of the Buck through a switch tube, and then supplied to a system through an output module (USB Type-C Connector, USB-C). Meanwhile, the system controls the adaptor to switch an output voltage through the USB-C.

SUMMARY

The present disclosure provides a power control circuit and a control method thereof, which can improve the applicability of the power control circuit while meeting the requirements of the USB PD, thereby protecting an external system from overvoltage and overcurrent, and avoid a system from being damaged.

The power control circuit provided by the present disclosure includes a power supply module, a voltage change signal module, an output module, a first switch module and a second switch module; the power supply module is configured to output power supplies of different power on two output terminals according to an output of an external power supply end and a received first control signal; the output module is connected to the two output terminals of the power supply module, and configured to provide the power supplies to an information processing system connected to the output module, and transmit a trigger signal provided by the information processing system to the voltage change signal module; the first switch module and the second switch module are disposed between the two output terminals of the power supply module and the output module respectively; the first switch module is configured to disconnect and conduct a power supply channel between one output terminal of the output module and the power supply module according to a received second control signal; the second switch module is configured to disconnect and conduct a power supply channel between the other output terminal of the output module and the power supply module according to a received third control signal; the voltage change signal module is connected to the first switch module, the second switch module, the power supply module and the output module, respectively, and configured to output the first control signal to the power supply module according to the trigger signal, and output the second control signal and the third control signal to the first switch module and the second switch module, respectively.

In some embodiments of the present disclosure, optionally, the power supply module includes: a first power supply unit connected to the output module via the first switch module, and configured to provide a power supply of a first power according to the output of the external power supply end; a second power supply unit connected to the second switch module, the voltage change signal module and the first power supply unit, respectively, and configured to convert the power supply of the first power according to the first control signal to provide a power supply of the second power.

In some embodiments of the present disclosure, optionally, the second power supply unit includes a DC-DC controller (a DC-DC converter), a third switch module, a fourth switch module and an inductor module; an input terminal of the DC-DC controller is connected to the first power supply unit via the third switch module; one end of the inductor module is connected to an output terminal of the DC-DC controller via the fourth switch module, and the other end is connected to the output module via the second switch module.

In some embodiments of the present disclosure, optionally, the second power supply unit further includes a first capacitor and a second capacitor; one end of the first capacitor is connected to a connection circuit between the third switch module and the first power supply unit, and the other end is grounded; one end of the second capacitor is connected to a connection circuit between the second switch module and the inductor module, and the other end is grounded.

In some embodiments of the present disclosure, optionally, the first switch module, the second switch module, the third switch module and the fourth switch module are MOS switch elements.

The present disclosure further provides a control method applied to the aforementioned power control circuit, the method including: before the power control circuit is connected to the information processing system, disconnecting the power supply channel between the power supply module and the output module through the first switch module and the second switch module; obtaining, by the voltage change signal module, a power demand of the information processing system through the output module, and controlling the power supply module, the first switch module and the second switch module through the first control signal, the second control signal and the third control signal according to the power demand, so that the power control circuit outputs a power supply of corresponding power through the output module.

In some embodiments of the present disclosure, optionally, controlling the power supply module, the first switch module and the second switch module through the first control signal, the second control signal and the third control signal according to the power demand, so that the power control circuit outputs a power supply of corresponding power through the output module includes: obtaining a trigger signal generated by the information processing system according to a required power supply; according to a comparison result of the trigger signal and a reference value, invoking the second control signal to conduct the power supply channel between the first power supply unit and the output module, and supplying power to the information processing system by the first power supply unit; and invoking the third control signal to conduct the power supply channel between the second power supply unit and the output module, and after adjusting an output power of the second power supply unit through the first control signal, supplying power to the information processing system by the second power supply unit.

In some embodiments of the present disclosure, optionally, according to a comparison result of the trigger signal and a reference value, invoking the second control signal to conduct the power supply channel between the first power supply unit and the output module, and supplying power to the information processing system by the first power supply unit includes: obtaining a target supply voltage of the information processing system according to the trigger signal, and when the target supply voltage is equal to the reference value, increasing an output voltage of the power control circuit; when the output voltage reaches the target supply voltage, controlling the first switch module through the second control signal to conduct the power supply channel between the first power supply unit and the output module; after a first preset time period, controlling the second power supply unit through the first control signal to stop providing the power supply of the second power.

In some embodiments of the present disclosure, optionally, according to a comparison result of the trigger signal and a reference value, invoking the third control signal to conduct the power supply channel between the second power supply unit and the output module, and after adjusting an output power of the second power supply unit through the first control signal, supplying power to the information processing system by the second power supply unit includes: obtaining a target supply voltage of the information processing system according to the trigger signal, and when the target supply voltage is lower than the reference value, controlling the second power supply unit through the first control signal to start providing the power supply of the second power; after a second preset time period, controlling the first switch module through the second control signal to cut off the power supply channel between the first power supply unit and the output module; adjusting the output voltage of the power control circuit according to the target supply voltage.

In some embodiments of the present disclosure, optionally, the power of the power supply provided by the first power supply unit is higher than the power of the power supply provided by the second power supply unit.

In the present disclosure, while protecting the system, the first switch module enables the power supply to be controlled autonomously when being connected to the system. In addition, the control method provided by the present disclosure can also ensure smooth switching of the output voltage, and avoid the output voltage overshoot or undershoot.

In order that the above and other objectives, features and advantages of the present disclosure are more obvious and understandable, the following embodiments will be described in detail with reference to the accompanied drawings.

BRIEF DESCRIPTION OF THE DRAWINGS

In order to more clearly describe the technical solutions in the embodiments of the present disclosure or in the prior art, the drawings to be used in the description of the embodiments or the prior art will be briefly introduced as follows. Obviously, the following drawings are not necessarily to scale, only illustrate some embodiments of the present disclosure, and those of ordinary skill in the art can obtain any other drawing from them without paying any creative effort.

DETAILED DESCRIPTION

A description of example embodiments follows.

The technical solutions in the embodiments of the present disclosure will be clearly and completely described below with reference to the drawings in the embodiments of the present disclosure. Obviously, those described are only a part, rather than all, of the embodiments of the present disclosure. Based on the embodiments of the present disclosure, any other embodiment obtained by those of ordinary skills in the art without paying any creative effort should fall within the protection scope of the present disclosure.

With reference to the following description and drawings, the specific embodiments of the present disclosure are disclosed in detail, and the ways in which the principle of the present disclosure can be adopted are pointed out. It should be understood that the scope of the embodiments of the present disclosure are not limited thereto. Within the scope of the spirit and provisions of the appended claims, the embodiments of the present disclosure include many changes, modifications and equivalents.

The features described and/or illustrated for one embodiment can be used in one or more other embodiments in the same or similar way, or combined with or substituted for features in other embodiments.

It should be emphasized that the term 'comprise/include' used herein refers to the presence of features, integers, steps or components, without excluding the presence or addition of one or more other features, integers, steps or components.

Figure 1:
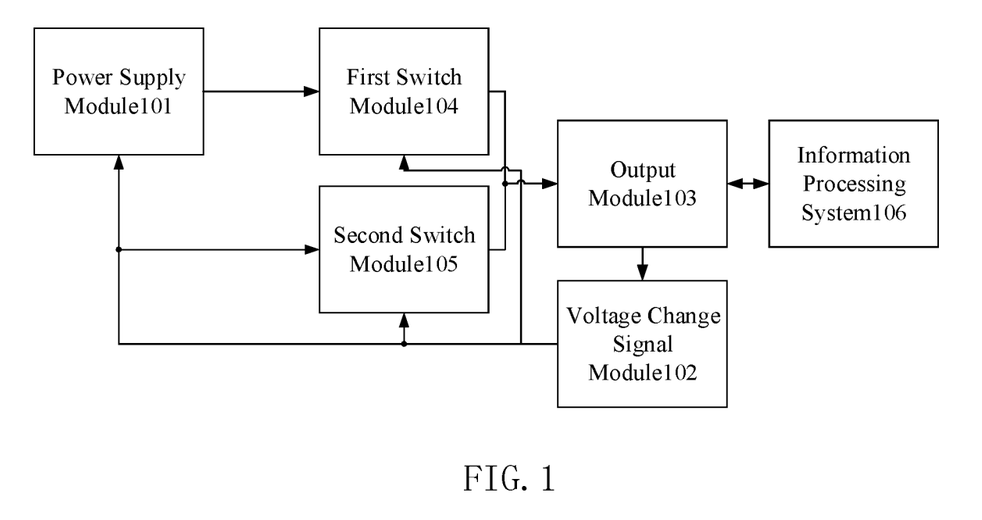
FIG. 1 illustrates a schematic diagram of a structure of a power control circuit according to an embodiment of the present disclosure.

As illustrated in FIG. 1, the present disclosure provides a power control circuit, including a power supply module 101, a voltage change signal module 102, an output module 103, a first switch module 104 and a second switch module 105; the power supply module 101 is configured to output power supplies of different power through two output terminals according to an output of an external power supply end and a received first control signal; the output module 103 is connected to the two output terminals of the power supply module 101, and configured to provide the power supplies to an information processing system 106 connected to the output module 103, and transmit a trigger signal provided by the information processing system 106 to the voltage change signal module 102; the first switch module 104 and the second switch module 105 are disposed between the two output terminals of the power supply module 101 and the output module, respectively; the first switch module 104 is configured to disconnect and conduct a power supply channel between one output terminal of the output module 103 and the power supply module 101 according to a received second control signal; the second switch module 105 is configured to disconnect and conduct a power supply channel between the other output terminal of the output module 103 and the power supply module 101 according to a received third control signal; the voltage change signal module 102 is connected to the first switch module 104, the second switch module 105, the power supply module 101 and the output module 103, respectively, and configured to output the first control signal to the power supply module 101 according to the trigger signal, and output the second control signal and the third control signal to the first switch module 104 and the second switch module 105, respectively.

Thus, during the actual applications, before the information processing system is connected to the power control circuit, the first switch module and the second switch module are turned off, and in this case, the power control circuit only supplies power to the voltage change signal module rather than the signal processing system; and when communicating with the information processing system through the input module to confirm a power supply of a required power, the voltage change signal module controls the connected first switch module, second switch module and power supply unit so that the power control circuit outputs a power supply of corresponding power. Thus, through this structure, the power control circuit can stop the power supply when being connected to the information processing system, and provide a power supply of corresponding power according to the requirements of the information processing system after the communication is completed, which not only meets the requirements of the USB PD, but also can protect the information processing system from overvoltage and overcurrent, thereby avoiding situations such as a system damage caused by a high-voltage input when the information processing system requires a low-voltage.

Figure 2:
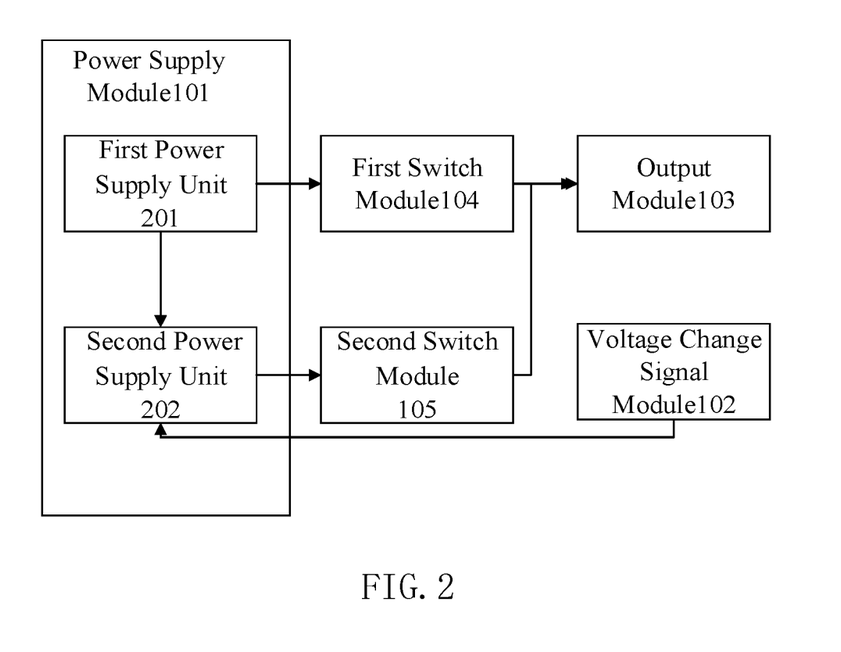
FIG. 2 illustrates a schematic diagram of a structure of a power supply module according to an embodiment of the present disclosure.

As illustrated in FIG. 2, in some embodiments of the present disclosure, the power supply module 101 includes: a first power supply unit 201 connected to the output module 103 through the first switch module 104, and configured to provide a power supply of a first power according to the output of an external power supply end; and a second power supply unit 202 connected to the second switch module 105, the voltage change signal module 102 and the first power supply unit 201, respectively, and configured to convert the power supply of the first power according to the first control signal to provide a power supply of a second power.

Specifically, the first power supply unit and the second power supply unit can respectively provide power supplies of different power to meet different requirements of the information processing system. After converting an external input voltage into a voltage of a predetermined amplitude, the first power supply unit may directly input the converted voltage into the information processing system through the first switch module, and in this case, the power is a maximum output power of the power control circuit. The power supply of the first power may also be input to the second power supply unit for a voltage conversion again to generate a power supply of the second power, which is input to the information processing system to meet the different power requirements of different information processing systems. In which, the first switch module may be controlled by the voltage change signal module, and the voltage change signal module may determine to adopt the power supply provided by the first power supply unit or the second power supply unit according to the power demand of the information processing system. For example, when the information processing system requires a voltage A, the voltage change signal module determines, from among the first power supply unit and the second power supply unit, that the first power supply unit supplies the voltage A, i.e., the maximum power of the power control circuit. Thus, the first power supply unit is controlled by the first switch module to supply power to the information processing system. When the information processing system requires the voltage B and B is less than A, the second power supply unit may supply the voltage B, and the power supply channel between the first power supply unit and the information processing system is cut off, and the second power supply unit is controlled to supply power to the information processing system. Of course, the voltage B in this embodiment has an interval, and its voltage value is determined based on the requirements of the information processing system. The first control signal output by the voltage change signal module is debugged, and the specific debugging flow will be described in detail in the subsequent embodiment.

In the above embodiment, the information processing system may be a desktop computer, a portable computer, a smart phone, a tablet device or any other intelligent electronic device, a network server, a network storage device, a switch, a router or any other network communication device, or any other suitable device, and the size, shape, performance, function and price may be different. Further, the processor of the information processing system may include processing resources for executing machine executable codes, such as a CPU, a programmable logic array (PLA), an embedded device such as a system-on-chip (SoC) or any other control logic hardware. The information processing system may further include one or more computer readable media for storing machine executable codes such as software or data.

Figure 3:
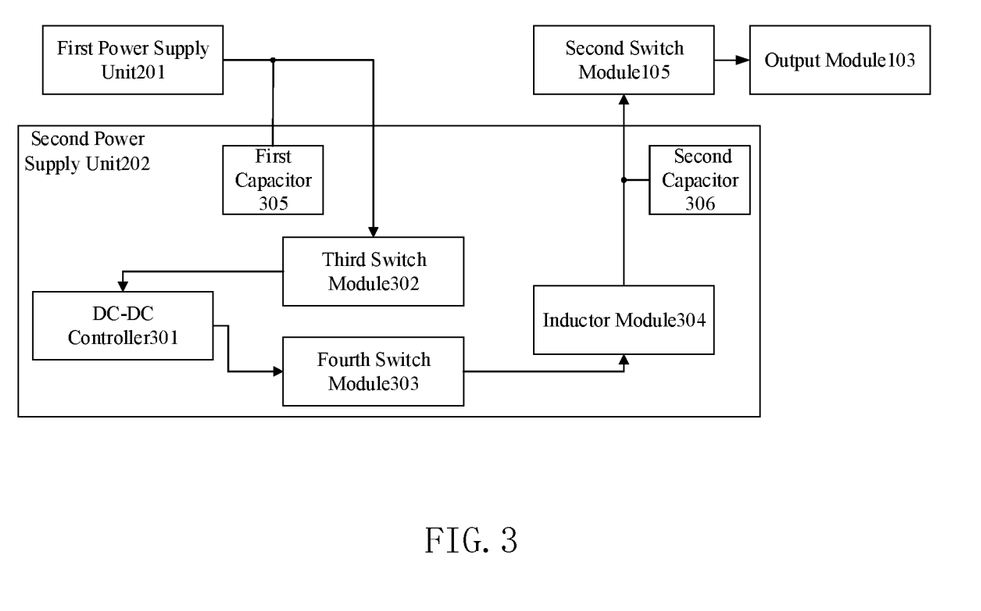
FIG. 3 illustrates a schematic diagram of a structure of a second power supply unit according to an embodiment of the present disclosure.

As illustrated in FIG. 3, in some embodiments of the present disclosure, the second power supply unit 202 includes a DC-DC controller 301, a third switch module 302, a fourth switch module 303 and an inductor module 304. An input terminal of the DC-DC controller 301 is connected to the first power supply unit 101 through the third switch module 302. One end of the inductor module 304 is connected to an output terminal of the DC-DC controller 301 through the fourth switch module 303, and the other end is connected to the output module 103 through the second switch module 105. Further, the second power supply unit further includes a first capacitor 305 and a second capacitor 306. One end of the first capacitor 305 is connected to a connection circuit between the third switch module 302 and the first power supply unit 101, and the other end is grounded. One end of the second capacitor 306 is connected to a connection circuit between the second switch module 105 and the inductor module 304, and the other end is grounded. Specifically, the first switch module, the second switch module, the third switch module and the fourth switch module may all be MOS switch elements. The first power supply unit may be a resonant power converter LLC. Therefore, a buck circuit is formed by the above structures to realize the voltage reduction and output, in which for the specific functions of the elements in the buck circuit, please refer to the existing buck topology, which will not be described in detail here. The power of the power supply converted by the DC-DC controller is not higher than that of the resonant power converter LLC.

Figure 4:
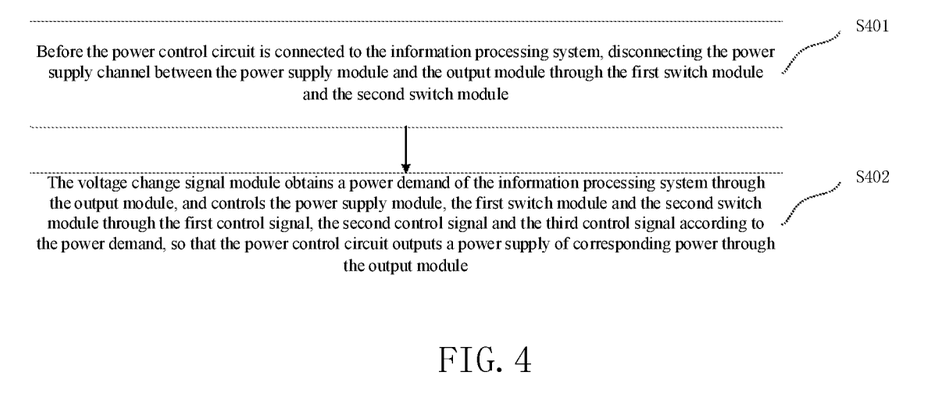
FIG. 4 illustrates a schematic diagram of a trigger control flow of a power control circuit according to an embodiment of the present disclosure.

As illustrated in FIG. 4, the present disclosure further provides a control method applied to the power control circuit, the method including:

S401: before the power control circuit is connected to the information processing system, disconnecting the power supply channel between the power supply module and the output module through the first switch module and the second switch module;

S402: the voltage change signal module obtains a power demand of the information processing system through the output module, and controls the power supply module, the first switch module and the second switch module through the first control signal, the second control signal and the third control signal according to the power demand, so that the power control circuit outputs a power supply of corresponding power through the output module.

Specifically, in actual works, before external alternating current is connected to the power control circuit to communicate with the information processing system, the first switch module and the second switch module may be controlled to be turned off, and in this case, the power control circuit will not supply power to the information processing system. After the communication is completed, the first switch module and the second switch module are turned on according to actual needs, so that the power control circuit supplies power to the information processing system. Therefore, the output of the power supply from the second power supply unit is limited by the second switch module, and the overvoltage and overcurrent protection of the information processing system is completed to avoid damage.

Figure 5:
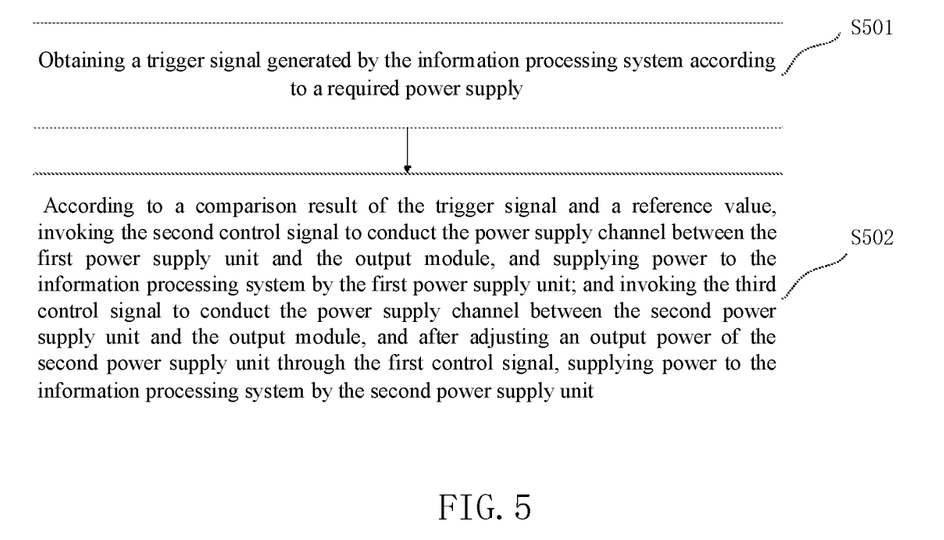
FIG. 5 illustrates a schematic diagram of a power adjustment flow according to an embodiment of the present disclosure.

In consideration that the power control circuit provides power supplies of different powers, as illustrated in FIG. 5, in some embodiments of the present disclosure, controlling the power supply module, the first switch module and the second switch module through the first control signal, the second control signal and the third control signal according to the power demand, so that the power control circuit outputs a power supply of corresponding power through the output module may include:

S501: obtaining a trigger signal generated by the information processing system according to a required power supply;

S502: according to a comparison result of the trigger signal and a reference value, invoking the second control signal to conduct the power supply channel between the first power supply unit and the output module, and supplying power to the information processing system by the first power supply unit; and invoking the third control signal to conduct the power supply channel between the second power supply unit and the output module, and after adjusting an output power of the second power supply unit through the first control signal, supplying power to the information processing system by the second power supply unit, wherein the power of the power supply provided by the first power supply unit is higher than the power of the power supply provided by the second power supply unit.

Figure 6:
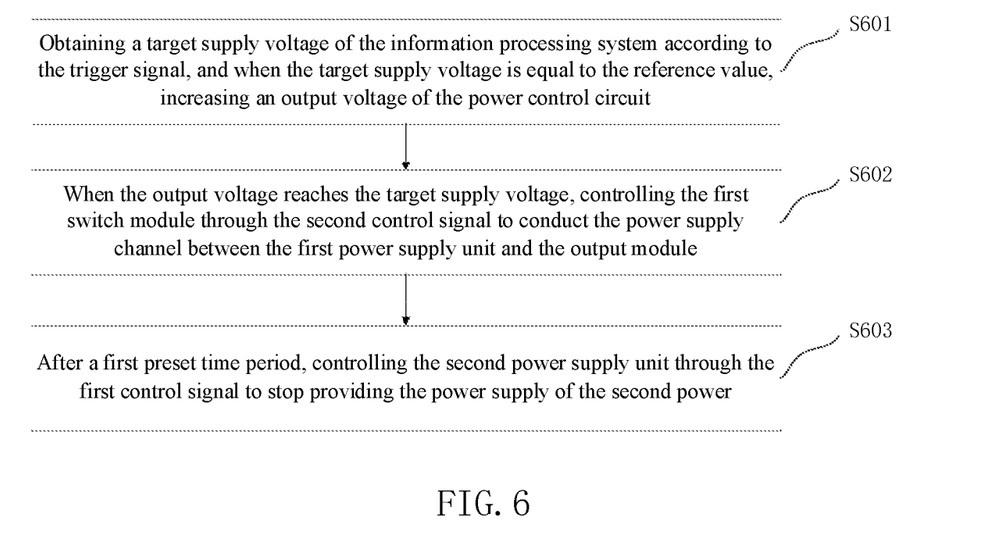
FIG. 6 illustrates a schematic diagram of a control flow of a high-voltage output according to an embodiment of the present disclosure.

When a power supply of a high power is required for the information processing system, a control logic provided by present disclosure is illustrated in FIG. 6, and invoking the first control signal and the second control signal according to the trigger signal to control the first power supply unit and the second power supply unit to provide power supplies of corresponding power to the information processing system may include:

S601: obtaining a target supply voltage of the information processing system according to the trigger signal, and when the target supply voltage is equal to the reference value, increasing an output voltage of the power control circuit;

S602: when the output voltage reaches the target supply voltage, controlling the first switch module through the second control signal to conduct the power supply channel between the first power supply unit and the output module;

S603: after a first preset time period, controlling the second power supply unit through the first control signal to stop providing the power supply of the second power.

Figure 7:
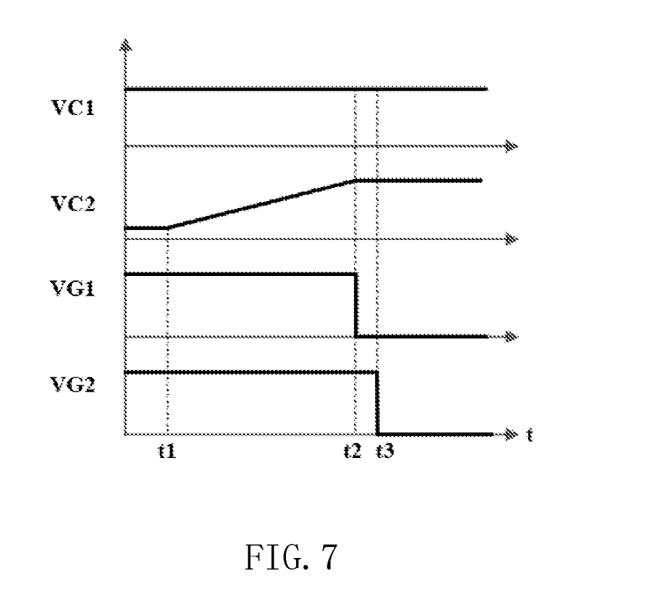
FIG. 7 illustrates a schematic diagram of a control timing of a high-voltage output according to an embodiment of the present disclosure.

This embodiment mainly aims at the control method of the power control circuit when the information processing system requires a high voltage and it is necessary to provide a power supply of a maximum power, please refer to FIG. 7:

VC1 is a power supply of the first power provided by the first power supply unit, and VC2 is a power supply at an entrance of the output module, wherein when the voltage change signal module acquires that the information processing system requires a high voltage, the output of the power control circuit is controlled to rise through feedback at timing t1 until the required voltage is reached at timing t2. In this case, the second control signal VG1 is set low to turn on the MOS switch element of the first switch module, so that the output of the LLC is connected to the system. At timing t3 after the first preset time period, the first control signal VG2 is set low to control the DC-DC controller to stop providing the power supply of the second power, wherein the first preset time period may be selected according to actual needs, and is no limited here.

Figure 8:
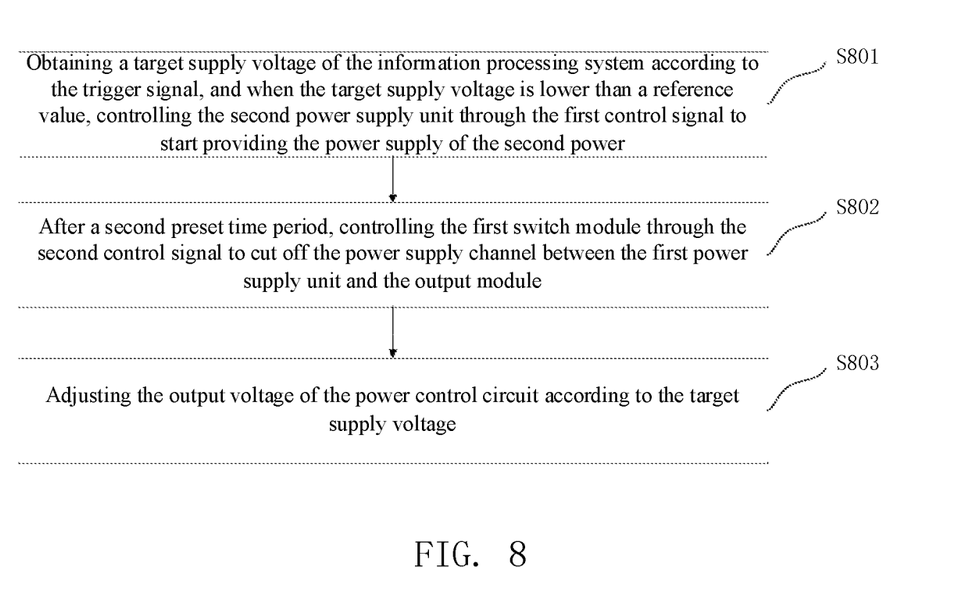
FIG. 8 illustrates a schematic diagram of a control flow of a low-voltage output according to an embodiment of the present disclosure.

When a power supply of a high power is required for the information processing system, a control logic provided by present disclosure is illustrated in FIG. 8. In some embodiments of the present disclosure, according to a comparison result of the trigger signal and a reference value, invoking the third control signal to conduct the power supply channel between the second power supply unit and the output module, and after adjusting an output power of the second power supply unit through the first control signal, supplying power to the information processing system by the second power supply unit may include:

S801: obtaining a target supply voltage of the information processing system according to the trigger signal, and when the target supply voltage is lower than a reference value, controlling the second power supply unit through the first control signal to start providing the power supply of the second power;

S802: after a second preset time period, controlling the first switch module through the second control signal to cut off the power supply channel between the first power supply unit and the output module;

S803: adjusting the output voltage of the power control circuit according to the target supply voltage.

Figure 9:
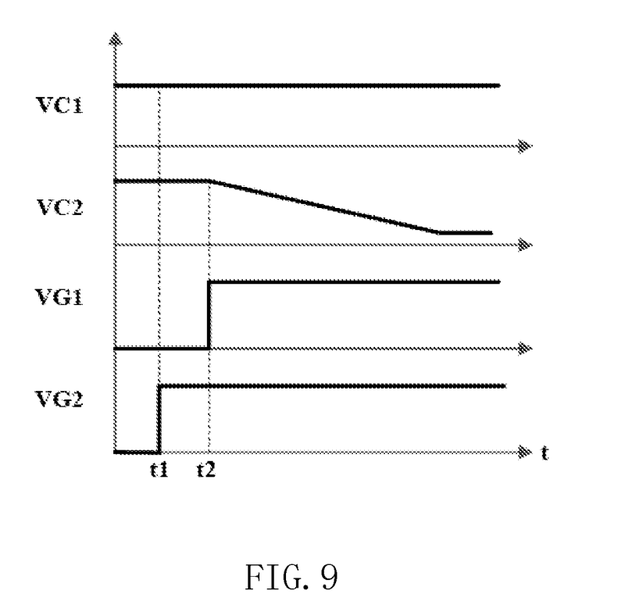
FIG. 9 illustrates a schematic diagram of a control timing of a low-voltage output according to an embodiment of the present disclosure.

This embodiment mainly aims at the control method of the power control circuit when the information processing system requires a low voltage and it is necessary to adjust the power of the power supply, and please refer to FIG. 9:

As mentioned above, VC1 is a power supply of the first power provided by the first power supply unit, and VC2 is a power supply at an entrance of the output module, wherein a low voltage is required to be output at timing t1; thus, VG2 is controlled to be set high (the DC-DC controller is turned on to provide the power supply of the second power), and VG1 is set high (the power supply from the LLC to the information processing system is cut off) at timing t2 of the second preset time period. In this case, the power control circuit can hold the output voltage, and the output of the power control circuit is adjusted to the target supply voltage required by the information processing system through feedback. Therefore, through the embodiments and the control timing illustrated in FIGS. 6 to 9, it is possible to ensure smooth switching of the output voltage without a large output voltage overshoot or undershoot.

The present disclosure has the following advantageous technical effects: while protecting the system, the first switch module enables the power supply to be controlled autonomously when being connected to the system. In addition, the control method provided by the present disclosure can also ensure smooth switching of the output voltage, and avoid the output voltage overshoot or undershoot.

It should be noted that herein, the relational terms such as 'first' and 'second' are only used to distinguish one entity or operation from another entity or operation, and do not necessarily require or imply any such actual relationship or sequence between these entities or operations. In addition, the term 'comprise', 'include' or any other variation thereof is intended to cover non-exclusive inclusions, so that a process, method, article or device that includes a series of elements includes not only those elements, but also other elements not explicitly listed, or further includes elements inherent to such process, method, article or device. Without further restrictions, an element defined by a statement 'comprising a . . . ' does not exclude the existence of other identical elements in a process, method, article or device that includes said element. An orientation or positional relationship indicated by a term such as 'upper' or 'lower' is based on the drawings, only for the convenience of describing the present disclosure and simplifying the description, rather than indicating or implying that the referred device or element must have a specific orientation, or be constructed and operated in a specific orientation, and therefore should not be understood as a limitation to the present disclosure. Unless otherwise specified and limited explicitly, the terms 'installation', 'connected' and 'connection' should be understood broadly, e.g., it may be possible for a fixed connection, a detachable connection, an integrated connection, a mechanical connection, an electrical connection, a direct connection, an indirect connection through an intermediate medium, or a communication between the interiors of two elements. For those of ordinary skill in the art, the specific meanings of the above terms in the present disclosure can be understood according to specific situations.

The embodiments of the present disclosure are all described in a progressive manner, and the same or similar portions of the embodiments can refer to each other. Each embodiment lays an emphasis on its distinctions from other embodiments. In the description of the present disclosure, the description of reference terms 'one embodiment', 'some embodiments', 'an example', 'a specific example' or 'some examples' and the like mean that the specific features, structures, materials, or characteristics described in conjunction with the embodiment(s) or example(s) are included in at least one embodiment or example of the present disclosure. In the present disclosure, the schematic expressions of the above terms do not necessarily aim at the same embodiment or example. Moreover, the described specific features, structures, materials, or characteristics may be combined in any one or more embodiments or examples in a suitable manner. In addition, those skilled in the art can combine different embodiments or examples described in the present disclosure and features thereof if there is no contradiction to each other.

In the present disclosure, specific examples are applied to describe the principle and the implementations of the present disclosure, and the description thereof is only for the purpose of helping understanding of the method and the core concept of the present disclosure. Meanwhile, according to the concept of the present disclosure, those skilled in the art can change the specific implementations and the application scope. To sum up, the content of the present disclosure should not be construed as restrictions thereto.

While example embodiments have been particularly shown and described, it will be understood by those skilled in the art that various changes in form and details may be made therein without departing from the scope of the embodiments encompassed by the appended claims.

What is claimed is:

1. A power control circuit, comprising a power supply, a voltage change signal circuit, an output circuit, a first switch and a second switch;
   the power supply is coupled to an external power supply and configured to output power supplies of different power through two output terminals according to a first control signal;
   the output circuit is connected to the two output terminals of the power supply, and configured to provide the power supplies of different power to an information processing system connected to the output circuit, and transmit a trigger signal provided by the information processing system to the voltage change signal circuit;
   the first switch and the second switch are disposed between the two output terminals of the power supply and the output circuit;
   the first switch is configured to disconnect and conduct a first power supply channel between an input terminal of the output circuit and the power supply according to a second control signal;
   the second switch is configured to disconnect and conduct a second power supply channel between the input terminal of the output circuit and the power supply according to a third control signal;
   the voltage change signal circuit module is connected to the first switch, the second switch, the power supply and the output circuit, and configured to output the first control signal to the power supply according to the trigger signal, and output the second control signal and the third control signal to the first switch and the second switch, respectively;
   wherein the power supply comprises:
   a first power supply unit connected to the external power supply and to the output circuit through the first switch, and configured to provide a power supply of a first power according to the second control signal;
   a second power supply unit connected to the second switch, the voltage change signal circuit and the first power supply unit, and configured to convert the power supply of the first power according to the first control signal to provide a power supply of a second power;

wherein the second power supply unit comprises a DC-DC controller, a third switch, a fourth switch and an inductor;

an input terminal of the DC-DC controller is connected to the first power supply unit through the third switch;

one end of the inductor is connected to an output terminal of the DC-DC controller through the fourth switch, and the other end is connected to the output circuit through the second switch.

2. The power control circuit according to claim 1, wherein the second power supply unit further comprises a first capacitor and a second capacitor;

one end of the first capacitor is connected to a connection circuit between the third switch and the first power supply unit, and the other end is grounded;

one end of the second capacitor is connected to a connection circuit between the second switch and the inductor, and the other end is grounded.

3. The power control circuit according to claim 1, wherein the first switch, the second switch, the third switch and the fourth switch are MOS switch elements.

4. A control method applied to the power control circuit according to claim 1, the method comprising:

before the power control circuit is connected to the information processing system, disconnect the first power supply channel and the second power supply channel between the power supply and the output circuit through the first switch and the second switch;

obtaining, by the voltage change signal circuit, a power demand of the information processing system through the output circuit, and controlling the power supply, the first switch and the second switch through the first control signal, the second control signal and the third control signal according to the power demand, so that the power control circuit outputs a power supply of corresponding power through the output circuit.

5. The control method according to claim 4, wherein controlling the power supply, the first switch and the second switch through the first control signal, the second control signal and the third control signal according to the power demand, so that the power control circuit outputs a power supply of corresponding power through the output circuit comprises:

obtaining a trigger signal generated by the information processing system according to a required power supply;

according to a comparison result of the trigger signal and a reference value, invoking the second control signal to conduct the first power supply channel between the first power supply unit and the output circuit, and supplying power to the information processing system by the first power supply unit; and invoking the third control signal to conduct the second power supply channel between the second power supply unit and the output circuit, and after adjusting an output power of the second power supply unit through the first control signal, supplying power to the information processing system by the second power supply unit.

6. The control method according to claim 5, wherein according to a comparison result of the trigger signal and a reference value, invoking the second control signal to conduct the first power supply channel between the first power supply unit and the output circuit, and supplying power to the information processing system by the first power supply unit comprises:

obtaining a target supply voltage of the information processing system according to the trigger signal, and when the target supply voltage is equal to the reference value, increasing an output voltage of the power control circuit;

when the output voltage reaches the target supply voltage, controlling the first switch through the second control signal to conduct the first power supply channel between the first power supply unit and the output circuit;

after a first preset time period, controlling the second power supply unit through the first control signal to stop providing the power supply of the second power.

7. The control method according to claim 5, wherein according to a comparison result of the trigger signal and a reference value, invoking the third control signal to conduct the second power supply channel between the second power supply unit and the output circuit, and after adjusting an output power of the second power supply unit through the first control signal, supplying power to the information processing system by the second power supply unit comprises:

obtaining a target supply voltage of the information processing system according to the trigger signal, and when the target supply voltage is lower than the reference value, controlling the second power supply unit through the first control signal to start providing the power supply of the second power;

after a second preset time period, controlling the first switch through the second control signal to cut off the first power supply channel between the first power supply unit and the output circuit;

adjusting the output voltage of the power control circuit according to the target supply voltage.

8. The control method according to claim 4, wherein the power of the power supply provided by the first power supply unit is higher than the power of the power supply provided by the second power supply unit.

* * * * *

UNITED STATES PATENT AND TRADEMARK OFFICE
CERTIFICATE OF CORRECTION

PATENT NO. : 12,259,765 B2
APPLICATION NO. : 17/933764
DATED : March 25, 2025
INVENTOR(S) : Yuetian Wang Page 1 of 1

It is certified that error appears in the above-identified patent and that said Letters Patent is hereby corrected as shown below:

In the Claims

In Column 10, Claim 1, Line 53, please delete "module" after "circuit".

Signed and Sealed this
Twenty-ninth Day of April, 2025

Coke Morgan Stewart
*Acting Director of the United States Patent and Trademark Office*